United States Patent
McCann et al.

(10) Patent No.: US 9,313,730 B2
(45) Date of Patent: Apr. 12, 2016

(54) PUBLIC LAND MOBILE NETWORK ("PLMN") DISCOVERY COMMUNICATIONS IN A WIRELESS NETWORK

(71) Applicant: Research In Motion Limited, Waterloo (CA)

(72) Inventors: Stephen McCann, Southhampton (GB); Michael Peter Montemurro, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 300 days.

(21) Appl. No.: 13/768,724

(22) Filed: Feb. 15, 2013

(65) Prior Publication Data

US 2014/0233544 A1 Aug. 21, 2014

(51) Int. Cl.
*H04W 4/00* (2009.01)
*H04W 48/18* (2009.01)
*H04W 48/16* (2009.01)

(52) U.S. Cl.
CPC .............. *H04W 48/18* (2013.01); *H04W 48/16* (2013.01)

(58) Field of Classification Search
USPC ......................................................... 370/338
See application file for complete search history.

(56) References Cited

U.S. PATENT DOCUMENTS

| | | | |
|---|---|---|---|
| 7,096,014 B2 | 8/2006 | Haverinen et al. | |
| 8,750,180 B2 * | 6/2014 | McCann | H04W 76/021 370/310 |
| 2003/0119481 A1 * | 6/2003 | Haverinen | H04W 8/065 455/411 |
| 2008/0248747 A1 * | 10/2008 | Buckley | H04W 48/16 455/39 |
| 2012/0120933 A1 * | 5/2012 | Schatzmayr | H04L 63/18 370/338 |
| 2013/0039275 A1 * | 2/2013 | Patil | H04W 48/20 370/328 |
| 2013/0267203 A1 * | 10/2013 | Qiang | H04W 48/18 455/411 |
| 2014/0112325 A1 * | 4/2014 | Calcev | H04W 48/16 370/338 |
| 2014/0286242 A1 * | 9/2014 | McCann | H04W 48/16 370/328 |

FOREIGN PATENT DOCUMENTS

| | | |
|---|---|---|
| EP | 1657943 A1 | 5/2006 |
| WO | 2012149400 A2 | 11/2012 |

OTHER PUBLICATIONS

PCT International Search Report; Application No. PCT/CA2014/050099; May 23, 2014; 4 pages.
PCT Written Opinion of the International Searching Authority; Application No. PCT/CA2014/050099; May 23, 2014; 5 pages.
Ntantogian, Christoforos et al.; "Reducing Authentication Traffic in 3G-WLAN Integrated Networks"; The 18th Annual IEEE International Symposium on Personal, Indoor and Mobile Radio Communications (PIMRC'07); 2007; 5 pages.

* cited by examiner

*Primary Examiner* — Faruk Hamza
*Assistant Examiner* — Shah R Zaman
(74) *Attorney, Agent, or Firm* — Conley Rose, P.C.; J. Robert Brown, Jr.

(57) ABSTRACT

A mobile device may retrieve information about a network prior to associating with the network. For example, the information may be related to a public land mobile network ("PLMN") and compatibility with Extensible Authentication Protocols ("EAPs").

6 Claims, 8 Drawing Sheets

PUBLIC LAND MOBILE NETWORK ("PLMN") DISCOVERY COMMUNICATIONS IN A WIRELESS NETWORK

BACKGROUND

Wireless network deployments, such as wireless local area networks ("WLANs"), allow mobile devices to access network and Internet services when within proximity of wireless communication signals of those wireless networks. Through network discovery communications with the WLAN, a mobile device, wireless terminal, or station ("STA") may obtain network information about an access point or access network. An Access Network Query Protocol ("ANQP") may allow the mobile device to request additional network information prior to establishing network connectivity. Such information may include information about public land mobile networks ("PLMNs"). However, the information about a WLAN and its PLMNs may be limited and may not include sufficient information for a mobile device to select a WLAN.

DETAILED DESCRIPTION

The disclosed systems and methods allow mobile devices to obtain discovery information about public land mobile networks ("PLMNs") and/or network Realms that may connect to one or more wireless local area networks ("WLANs"). The discovery information may be requested and received from the WLAN before association with that WLAN. In other words, pre-association/discovery information from the mobile device is sent to the WLAN that includes information about PLMN(s) and/or network Realms connected with the WLAN. The discovery information that may be transmitted prior to network association may include the PLMN compatibility with different authentication protocols, including Extensible Authentication Protocol Methods ("EAP methods") such as EAP-SIM, EAP-AKA, and/or EAP-AKA'. Additionally or alternatively, the discovery information may include one or more network Realms associated with the EAP methods that the network Realms may respectively support. In some embodiments, the discovery information may be used by a mobile device in deciding whether to associate with a particular WLAN. For example, if a device may utilize a particular type of authentication protocol (e.g. an EAP method) and may look for PLMNs that support that type of authentication protocol.

The discovery information that is communicated prior to associating with a WLAN may utilize an advertisement protocol similar to Access Network Query Protocol ("ANQP"), which allows a mobile device to retrieve discovery information prior to associating with that WLAN. As described below, that discovery information may include PLMN information and similar network identifiers. ANQP supports information retrieval from an Advertisement Server that supports a Generic Advertisement Service ("GAS"). ANQP and GAS are defined in IEEE® 802.11u™ and also IEEE® 802.11-2012™, the entire disclosures of which is incorporated by reference. Further extensions are also specified in the Wi-Fi Alliance Hotspot 2.0 specification and the Wi-Fi Alliance Wi-Fi Direct specification. ANQP and GAS are further described below. In various embodiments, a mobile device may utilize GAS and ANQP after associating with a WLAN during, for example, Generic Access Network ("GAN") handovers.

Other advertisement protocols that may be utilized to retrieve discovery information prior to association with a WLAN such as Registered Location Query Protocol ("RLQP") as defined IEEE® 802.11af™.

Communications prior to association with a WLAN may be referred to discovery communications or communications while a mobile device (e.g., a STA) is in a pre-associated state of operation in accordance with various communication standards such as the IEEE® (Institute for Electrical and Electronics Engineers) 802.11 standard. For example, as described in IEEE 802.11, a pre-associated state of a mobile device may include states such as, but not limited to, a "State 1: Initial start state, unauthenticated, unassociated" in which the device has neither authenticated or associated with a network and a "State 2: Authenticated, no associated" in which a mobile device has authenticated with a network but not yet associated with the network.

An advertisement protocol (e.g. ANQP) allows the transmission of frames between a mobile device and a server in the network (e.g. WLAN) prior to network connectivity and that connection is through the layer 2 radio service (see FIG. 2) and is before any exchange of authentication parameters and without a recognized session. In other words, no session keys are established and no internet protocol ("IP") address is assigned. Communications during this state may be referred to as network discovery or discovery communications. According to the IEEE 802.11 standard, data traffic may not be allowed in this state and any signaling information may be insecure. A mobile device may use this discovery information as a hint for network selection and can verify this information after it associates and authenticates to the network ANQP may operate as a query and response protocol that is used by a WLAN mobile device to discover a range of information from a server (e.g., an advertisement server). This server may be either co-located with an access point ("AP") or is located within the WLAN hotspot, or remotely in an external network (e.g., another WLAN, a cellular network, or a packet data network). When the access point and server providing the information are not co-located, the AP is responsible for the transmission of the mobile device's query to the server in the external network and for delivering the server's response back to the mobile device. Network Information obtained through ANQP may include: roaming relationships, supported security methods (e.g. IEEE 802.1X and web-based authentication), supported EAP methods and similar authentication protocols, supported credential types, emergency services capability, available Service Providers (SPs), etc. This enables ANQP to discover information about external networks accessible via hotspots, prior to the WLAN mobile device establishing network connectivity. As described below, this discovery information may include information about PLMNs.

Figure 5:
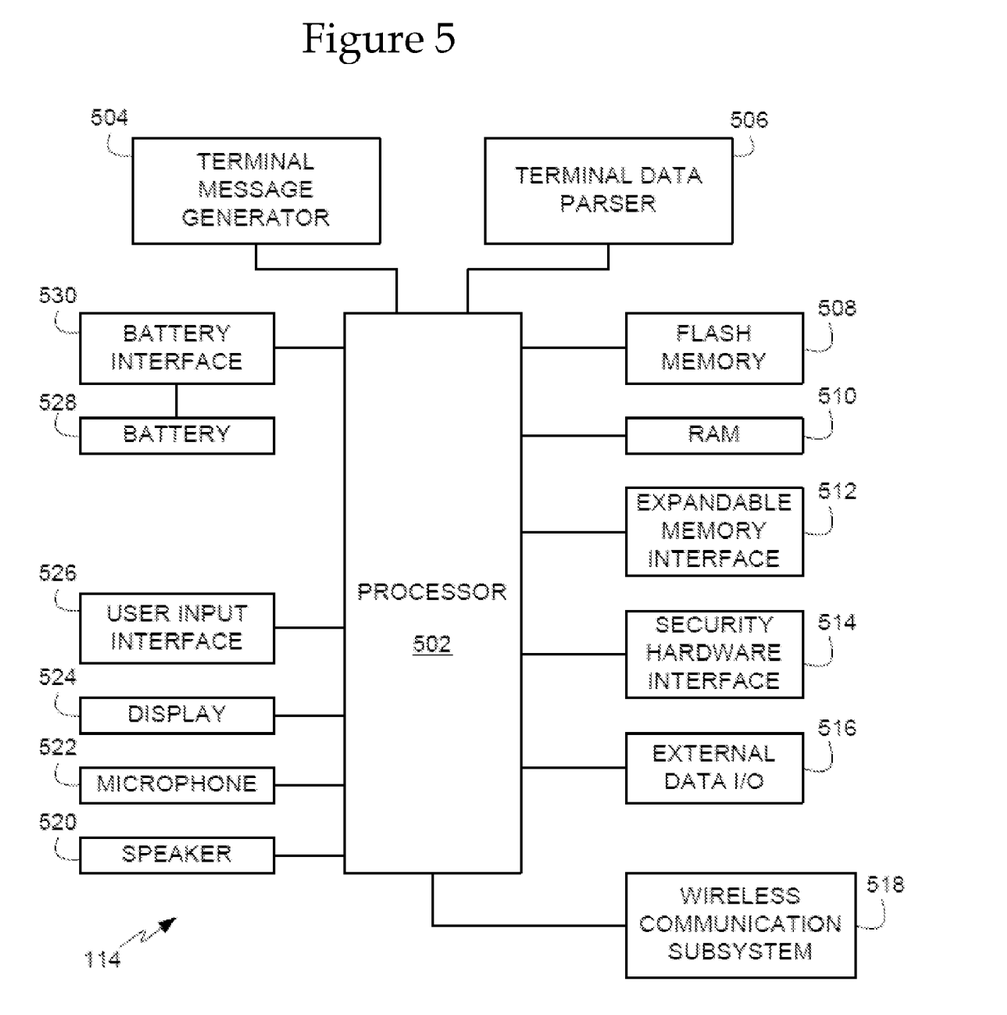
FIG. 5 illustrates a mobile device ("STA")

Mobile devices that communicate prior to network association may include mobile communication devices, mobile computing devices, or any other device capable of communicating wirelessly with a wireless network. Such devices may also be referred to as terminals, mobile devices, stations ("STA") or user equipment, and may also include mobile smart phones (e.g., a BlackBerry® smart phone or BlackBerry® Playbook), wireless personal digital assistants ("PDA"), machine to machine equipment, equipment within a smart grid ("SmartGrid"), equipment within a mesh network (an ad-hoc or peer network), laptop/tablet/notebook/netbook computers with wireless adapters, etc. FIG. 5 illustrates one embodiment of a mobile device or terminal.

Some devices may discover information about the external networks (e.g., PLMNs) which may include a wireless local area network ("WLAN"). The network discovery and connectivity in a WLAN may occur through standards that define access, control and communications in networks, such as the communication standard known as IEEE® (Institute for Electrical and Electronics Engineers) 802.11, which, among other things, defines an amendment entitled "interworking with external networks." Alternatively, the network discovery and connectivity may be subject to other parts of the IEEE 802.11 standard and other wireless communication standards including WLAN standards including any IEEE® 802.xx standard (e.g. IEEE 802.15, IEEE 802.16, IEEE 802.19, IEEE 802.20, IEEE 802.22 and IEEE 802.24), personal area network standards, wide area network standards, or cellular communication standards.

One exemplary network may be a WLAN and is described below. Alternatively, the devices may discover information about other networks through other protocols and architectures, including a cellular network or a WiMax network. The network may comprise a publicly accessible network, such as the Internet, a private network, such as an intranet, or combinations thereof, and may utilize a variety of networking protocols now available or later developed including, but not limited to TCP/IP based networking protocols. The networks may include any communication method or employ any form of machine-readable media for communicating information from one device to another.

The discovery of PLMN information (i.e. discovery communications) may be implemented in many environments providing WLAN access for network connectivity or in WLAN access locations or environments in which it may be expected that one or more users carrying respective mobile devices will associate with (i.e., join or connect to) and disassociate from a wireless network, access point, or WLAN as they enter and exit the WLAN access locations or environments.

Some WLAN locations or environments may be known as "hotspots" in reference to a location or environment that is within communication range of WLAN signals. WLAN locations or environments may include coffee shops, retail stores, home locations (e.g. homes and apartments), educational facilities, office environments, airports, public transportation stations and vehicles, hotels, etc. Such WLANs are often implemented as access networks that provide access to publicly accessible networks and may be associated with, or support access to, external networks (or WLAN-supported networks) owned and/or operated by subscription-based service providers. For example, an external network can be owned and/or operated by an Internet-access service provider or a telecommunications carrier/service provider that provides subscription-based Internet access for a fee (e.g., a monthly fee). In some systems, a subscriber/user may subscribe to such a service can use wireless network access and/or Internet-access services based on such a subscription when the subscriber is in communication proximity of the WLAN with an appropriate mobile device. In some instances, different WLANs may be connected with different PLMNs, which are compatible with different protocols (e.g. different EAP methods). For example, some WLANs may provide access to particular PLMNs.

GAS may serve as a transport mechanism, at layer-2 (see e.g. FIG. 2), for an advertisement protocol, such as ANQP. The advertisement protocol may connect the mobile device to one of several interworked servers. The advertisement protocol allows the transmission of frames between a mobile device and a server in the network prior to network connectivity. For example, GAS provides support for operations such as network selection by a mobile device, as well as for communication between the mobile device and other information resources in the network before the mobile device associates with a WLAN. The mobile device may be connected to a layer-2 radio service, without exchanging any authentication parameters or without having a recognized session (because no session keys are established and no internet protocol address is assigned). When in compliance with the IEEE 802.11 standard, no data traffic is allowed in this state.

Other layer-2 transport mechanisms or even authentication mechanisms may be used. For example, the Extensible Authentication Protocol ("EAP") may be used to carry the advertisement protocol, as an alternative to GAS. The advertisement protocol information may be encapsulated within a suitable EAP-TLV (type length value) method frame (or alternative EAP method frame) and transported by the EAP. Use of secure credentials exchanged during the EAP transactions would also provide a level of security for any information carried within the advertisement protocol. For example, if any EAP method using Subscriber Identity Module (SIM) based credentials (e.g. EAP-SIM, EAP-AKA, or EAP-AKA') were to be the authentication protocol, any advertisement protocol information encapsulated (i.e. securely carried) within a suitable EAP-TLV frame during the same EAP transaction may also be protected by the SIM credentials. EAP SIM may allow for the exchange of credentials in a SIM card either over a wireless network link or over an Internet link. EAP Authentication and Key Agreement ("EAP-AKA") is an EAP mechanism for authentication and session key distribution using either a SIM, a Universal Mobile Telecommunications System ("UMTS") SIM ("USIM"), or a Universal Integrated Circuit Card (UICC) which includes a SIM and/or a USIM. EAP-AKA' ("AKA Prime") is variant of EAP-AKA for non-3GPP access to a 3GPP core network, for example via WLAN or WiMax.

A PLMN may include a mobile country code ("MCC") and a mobile network code ("MNC"). The MCC identifies a country and the MNC identifies a network provider (e.g. VERIZON, AT&T, SPRINT, etc.). Each operator providing mobile services may have its own PLMN. PLMNs may connect with other PLMNs and public switched telephone networks ("PSTN") for telephone communications or may connect with internet service providers for data and internet access. Access to PLMN services may be through an air interface with radio communications between mobile devices or other wireless enabled user equipment ("UE") and land based radio transmitters or radio base stations. The objective of a PLMN may be to facilitate wireless communication and to interconnect a wireless network with a fixed wired network.

A particular WLAN or hotspot may be connected with one or more PLMNs. In various embodiments, the PLMNs correspond to cellular networks through which a WLAN is provided at a hotspot. Accordingly, a mobile device may only want to connect with AT&T hotspots. If the hotspot is connected with multiple cellular networks, those networks or PLMNs may be identified in a list to the mobile device through discovery communications about the hotspot. ANQP communications may be used to discover PLMNs associated with a wireless local area network ("WLAN"). As described below, the PLMN information that is communicated prior to network association may be modified.

Figure 1:
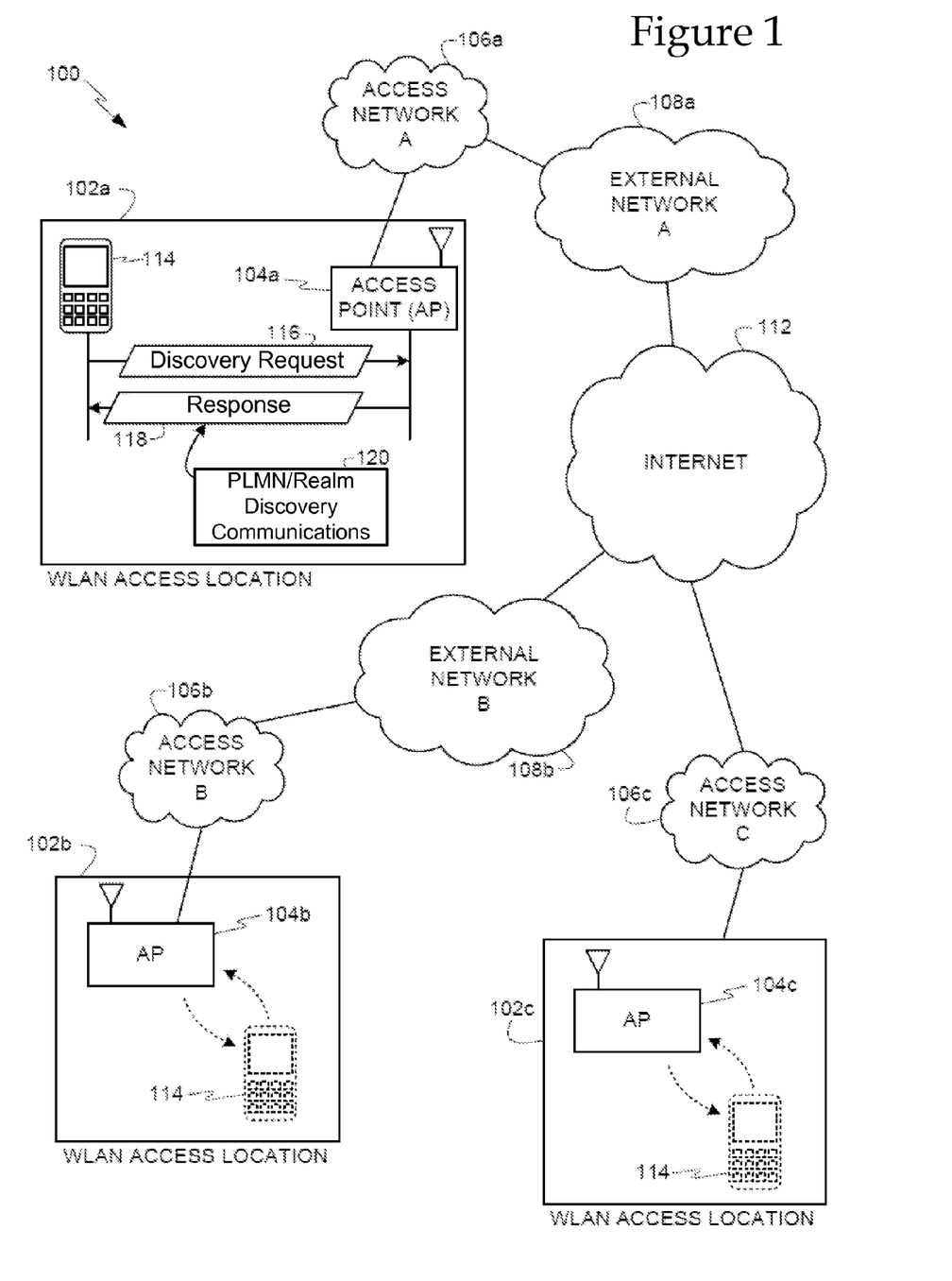
FIG. 1 illustrates a communication network.

FIG. 1 illustrates a communication network 100. Network discovery information may be communicated during network discovery using ANQP over the communications network 100. The communication network 100 includes a plurality of WLAN access point locations 102a-c (i.e., the radio coverage of access points 104a-c) having respective access points ("APs") 104a-c that provide access to respective access networks 106a-c. The APs 104a-c are further described with respect to FIG. 6. The access network A 106a provides access to an external network A 108a and the access network B 106b provides access to an external network B 108b. Unlike the access networks A 106a and B 106b that do not connect directly to the Internet 112, the access network C 110 may connect directly to a publicly accessible network like the Internet. Thus, the access network C 106c may be a public network, while the access networks A 106a and B 106b may be private networks.

In one embodiment, each of the external networks A 108a and B 108b may be a subscription service provider network ("SSPN") owned or operated by data subscription service providers, Internet subscription service providers, media (e.g., audio/video) subscription service providers, wireless communications subscription service providers, or any combination thereof. The external networks A 108a and B 108b are connected to the Internet 112 and may, for example, provide subscription-based Internet access to mobile device devices. In some implementations, roaming agreements between different subscription service providers may enable the external networks A 108a and B 108b to support roaming connections for mobile devices associated with other subscription service providers. In various embodiments, one or more of the external networks 108a-b are PLMNs. Alternatively, networks 106a-c may be PLMN networks.

The WLAN access location 102a illustrates a mobile device 114 in wireless range of the access point ("AP") 104a. The mobile device 114 is further described with respect to FIG. 5. The AP 104a connects with the access network A 106a, which may provide a direct or indirect connection to other networks, including publicly accessible network like the Internet 112. Prior to the mobile device 114 associating with the access network A 106a, mobile device 114 sends a discovery request 116 to the AP 104a. The AP 104a may respond with a discovery response 118. In alternative embodiments, the discovery request 116 may originate from the AP 104a and the discovery response 118 may be from the mobile device 114, such as with mesh, peer to peer, ad-hoc or Wi-Fi Direct networks. The discovery request 116 or the discovery response 118 may include PLMN discovery communications 120 or network Realm discovery communications 120 (also referred to herein as discovery communications 120 or PLMN/Realm discovery communications). The discovery communications 120, may also be referred to as PLMN/Realm information, network information, discovery information, or network discovery information, and may include information about the PLMN or the network Realm that the device communicates with prior to the device associating with the WLAN. Accordingly, the discovery communications 120 may be referred to as pre-association communications or pre-association information. As such, the discovery request 116 may be a request message requesting information about a PLMN or a request message requesting information about a network Realm, and the response 118 may be a response message including information about a PLMN or a network Realm. For the sake of simplicity, FIGS. 3-4 simply illustrate discovery communications 120 including only PLMN information. In one embodiment, the discovery communications 120 may be communicated using ANQP.

The discovery communications (request 116 and response 120) may be exchanged at a media access control ("MAC") sub-layer of a data link layer of the Open Systems Interconnection ("OSI") Reference Model without needing to use operations at or above an internet protocol ("IP") layer (i.e., a network layer) and without needing to otherwise provide access to the IP layer while discovering discovery communications 120. Discovering information using messages exchanged at or above the network layer may require more processing power for a mobile device than implementing processes at the MAC sub-layer. The layers in which the discovery communication occurs are further illustrated in FIG. 2.

Each of the APs 104a-c and the mobile device 114 may include a network adapter or network interface card that facilitates connections to a wireless medium. The network interface component may be referred to as a station ("STA"). The mobile device 114 may associate with different APs (e.g., the APs 104a-c) based at least partially on the discovery communications 120 that are provided through a particular AP from an external network. The mobile device 114 may receive information from the APs when moved in range of one of the WLAN access locations 102a-c, respectively.

Figure 2:
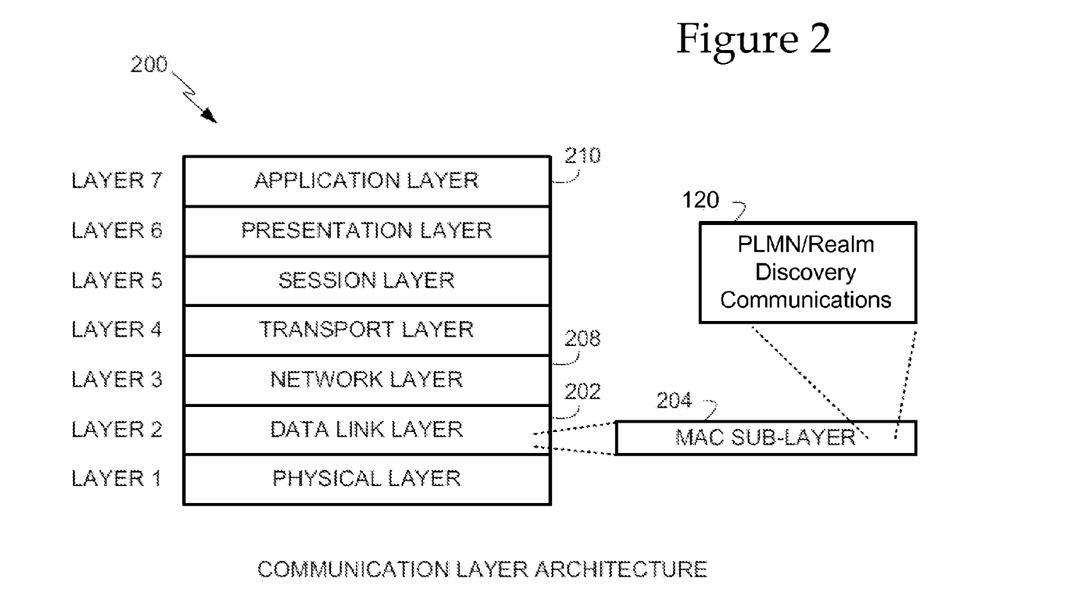
FIG. 2 illustrates a communication layer architecture.

FIG. 2 illustrates a communication layer architecture 200. The communication layer architecture 200 includes seven layers which may be implemented in accordance with the Open Systems Interconnection ("OSI") Reference Model. The communication layer architecture 200 includes a data link layer 202, which includes a media access control ("MAC") sub-layer 204. The MAC sub-layer provides addressing and channel access control mechanisms that make it possible for several devices or network nodes to communicate within a multiple access network that incorporates a shared medium, e.g. Ethernet. The hardware that implements the MAC may be referred to as a medium access controller. The MAC sub-layer acts as an interface between the logical link control ("LLC") sub layer and the network's physical layer. The MAC layer emulates a full-duplex logical communication channel in a multi-point network. This channel may provide unicast, multicast or broadcast communication service Mobile devices (e.g., the mobile device 114 of FIG. 1) may provide discovery communications 120 (e.g. the discovery request 116 and the discovery response 118) with wireless APs (e.g., the APs 102a-c of FIG. 1) at the MAC sub-layer 204. A mobile device may access information from a memory or other hardware of the mobile device at the MAC sub-layer 204 without needing to perform operations at or above an internet protocol layer (e.g., a network layer 208) and without needing to provide access to the internet protocol layer. Mobile devices (e.g., the mobile device 114 of FIG. 1) that include mobile smart phones, PDA's, processor based devices, etc. may have relatively limited processor cycles and less available electrical power than fixed-location computing devices powered using wired (e.g. alternating current) electricity sources. Low-level resource operations at the MAC sub-layer require relatively fewer system resources than user-interface-intensive and operating system intensive operations (e.g., web-browser operations) at an application layer.

Some communications or authentication techniques that use hypertext transfer protocol ("HTTP") or other internet protocol processes may require establishing a connection between a mobile device and a wireless access point at one or more of the layers between and including the network layer 208 and an application layer 210 of the communication layer architecture 200. In these applications, discovery communications 120 may not require a connection or access to the network layer 208 or any layers within a protocol suite. An inclusion of a discovery communication 120 on the MAC sub-layer 204 may allow for a mobile device to communicate with a network without associating with the network. Discovering discovery information available via access points using the MAC sub-layer may be used for identifying which WLAN is supported by PLMNs with compatible features for a particular mobile device.

Figure 3:
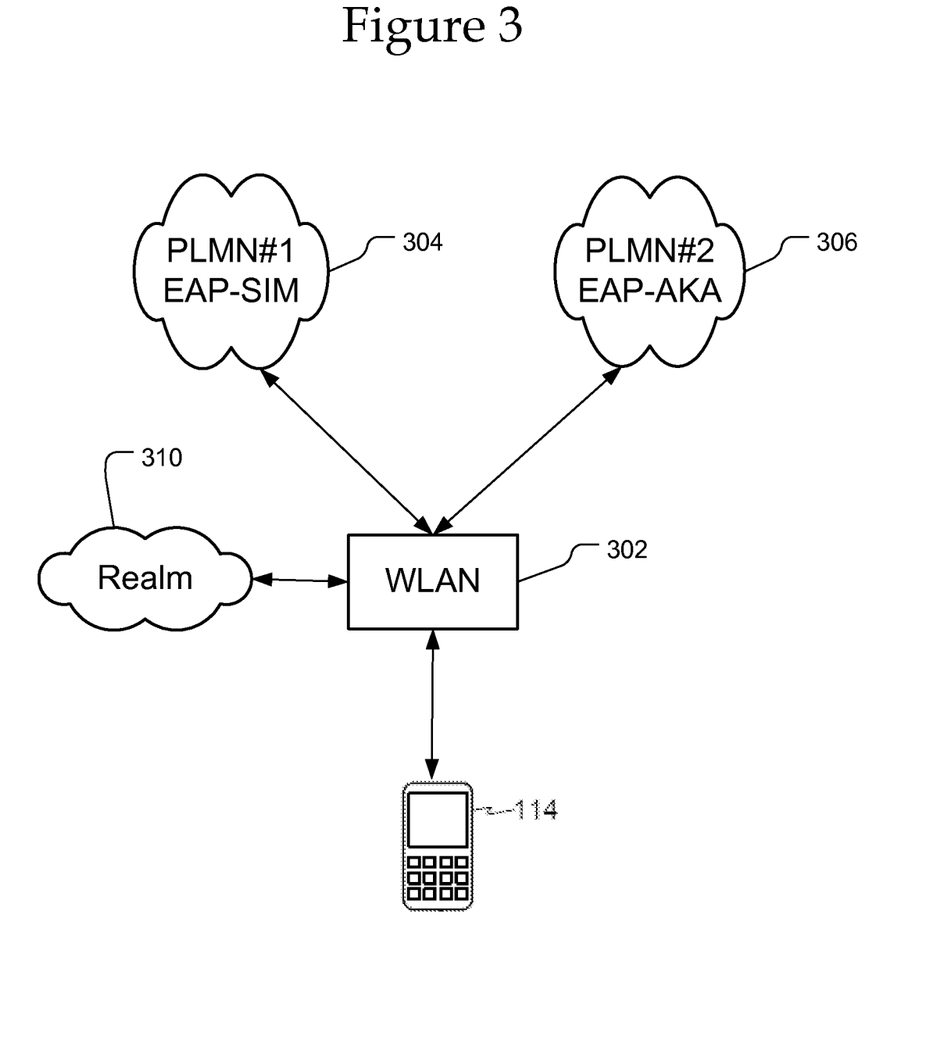
FIG. 3 illustrates an alternative communication network.

FIG. 3 illustrates an alternative communication network. The mobile device 114 is connected with a WLAN 302. The WLAN 302 may include one or more access points (e.g. access points 104 a-c in FIG. 1). The WLAN 302 may be connected with one or more PLMN networks, such as PLMN1 304 and PLMN2 306 as in FIG. 3. PLMN1 may utilize a different EAP method than PLMN 2. In particular, PLMN1 may utilize EAP-SIM, while PLMN utilizes EAP-AKA. The EAP method may be communicated to the mobile device 114 prior to network association. Although not shown, there may be an ANQP Server that conveys ANQP information. The ANQP Server may be an advertisement server in the network containing ANQP-elements or information that can be used to derive and communicate ANQP-elements. An ANQP Server may be a functional entity that supports proxy relationships with other ANQP Servers.

The discovery information that is communicated prior to network association may include an identifier of the EAP method. Receiving the discovery information prior to association with a WLAN may assist the mobile device in determining the supported EAP methods in each PLMN accessible via the WLAN. Possible SIM based EAP methods may be represented as shown in Table 1.

TABLE 1

| SIM based EAP method Enumerations | | |
| --- | --- | --- |
| EAP method | Value | Description |
| EAP-SIM | 18 | GSM Subscriber Identity Modules (EAP-SIM) |
| EAP-AKA | 23 | EAP-AKA Authentication |
| EAP-AKA' | 50 | EAP-AKA' |

Each enumerated value may be encoded as a 1-octet field. The description fields identify the EAP methods indicated by the value fields. The enumerated values may be included in the "EAP method" fields shown in Tables 2 and 3. An Information Element Identity ("IEI") may be modified such that: 00000000=PLMN List; 00000001=PLMN List with EAP methods; to 11111111=Reserved. The PLMN List with EAP methods information element may be used by the network to provide an indication of accessible PLMNs along with their respective associated EAP methods that can be selected via the WLAN. The information element may include PLMN identifiers and EAP method enumerated types as shown in Table 2:

TABLE 2

| PLMN List with EAP methods information element | |
| --- | --- |
| "PLMN List with EAP methods" IEI (e.g. 0x01) | octet 1 |
| ext    Length of PLMN List with EAP methods" | octet 2, 2a |

TABLE 2-continued

| PLMN List with EAP methods information element | |
| --- | --- |
| Length of PLMN with EAP method #1 | octet 3 |
| PLMN information #1, Octet 1 | octet 4 |
| PLMN information #1, Octet 2 | octet 5 |
| PLMN information #1, Octet 3 | octet 6 |
| EAP method Octet 1 (optional) | octet 7 |
| EAP method Octet 2 (optional) | octet 8 |
| Length of PLMN with EAP method #2 | octet 9 |
| PLMN Information #2, Octet 1 | octet 10 |
| ... | ... |

The length of the "PLMN list with EAP methods" field may indicate or identify the length of the entire information element without the IEI. The length indicated by the "PLMN with EAP method #1" field may be the length of the "PLMN information #1, octet 1" field, the "PLMN information #1, octet 2", and the "PLMN information #1, octet 3" and, additionally, a list of optional EAP methods, each optional EAP method being 1 octet in length. Therefore subtracting 3 octets (i.e., the total length of the PLMN information #1) from the length indicated by the "PLMN with EAP method #1" field enables the number of optional EAP methods to be determined for that entry based on each optional EAP method being 1 octet in length.

In some embodiments, a count field (e.g., the "Count of EAP methods with PLMN information #1" field as shown in Table 3) may be used to indicate the number of EAP method(s) associated with the PLMN identified via the "PLMN information #1" fields.

TABLE 3

| Alternative PLMN List with EAP methods information element | |
| --- | --- |
| "PLMN List with EAP methods" IEI (e.g. 0x01) | octet 1 |
| ext    Length of "PLMN List with EAP methods" | octet 2, 2a |
| Count of EAP methods with PLMN information #1 | octet 3 |
| PLMN information #1, Octet 1 | octet 4 |
| ... | ... |
| PLMN information #1, Octet 3 | octet 6 |
| EAP method Octet 1 (optional) | octet 7 |
| EAP method Octet 2 (optional) | octet 8 |
| Count of EAP methods with PLMN information #2 | octet 9 |
| PLMN Information #2, Octet 1 | octet 10 |
| ... | ... |

In other words, the "Count of EAP methods with PLMN information #1" field indicates the number of EAP methods that PLMN #1 supports. The embodiment discussed above (description with Tables 1-3) may return at least one particular EAP method that is associated with each PLMN. As shown in Tables 2 and 3, the "EAP method" is optional. In other words, these fields may not be present. In such implementations, it shall be understood (for example, by the requesting device) that EAP-SIM is the default EAP method supported by the PLMN. Referring to FIG. 3, the discovery communications from the mobile device 114 to the WLAN 302 may request the EAP method(s) for each PLMN. In one example, the resulting response from the WLAN may be an indication of EAP-SIM for PLMN#1 304 and an indication of EAP-AKA for PLMN#2 306.

In other embodiments, the discovery communications may be generated to return information regarding the PLMNs supporting a specific EAP method. For example, a mobile device utilizing an EAP method may want to know which PLMNs of cellular networks support that EAP method. In these embodiments, the mobile device may transmit a GAS query for those PLMNs that support a specific EAP method as shown in Table 4. The GAS response transmitted by the WLAN in response to the GAS request identifies each PLMN that supports the requested EAP method.

Figure 4:
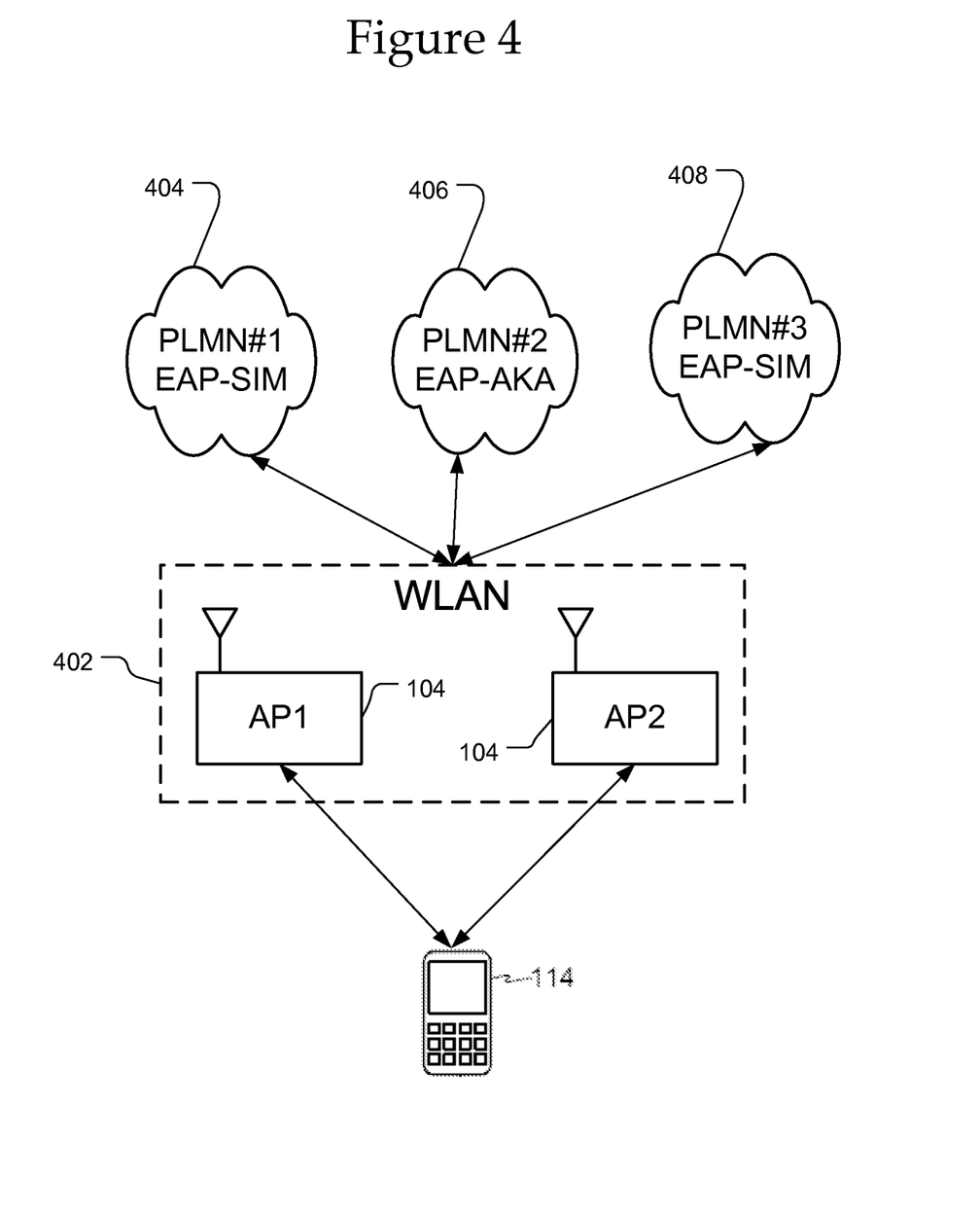
FIG. 4 illustrates another alternative communication network.

Referring to FIG. 4, the WLAN 402 is connected with three PLMNs 404, 406, and 408. A request from the mobile device 114 for PLMNs that support a particular EAP method (e.g. EAP-SIM) will return an indication of each of the PLMNs (e.g., PLMN#1 and PLMN#3) that support that particular EAP method.

These embodiments may be achieved with a revised 3GPP Cellular Network ANQP element, entitled a "3GPP EAP method Cellular Network" ANQP element. The EAP method Cellular Network ANQP element may be used by a requesting mobile device to determine if a specified EAP method is supported by any of the PLMNs that are accessible via a WLAN that the mobile device is in communication range with. This may assist the mobile device in determining which WLAN to use (i.e., which WLAN to associate with). The requesting mobile device may utilize a 3GPP EAP method Cellular Network ANQP request for a specific EAP method as shown in Table 4:

TABLE 4

| 3GPP EAP method Cellular Network ANQP-Element Request | | | |
|---|---|---|---|
| | Info ID | Length | EAP method |
| Octets: | 2 | 2 | 1 |

The Info ID field, when included in a 3GPP EAP method Cellular Network ANQP-element request, may be a value (e.g., a number from 273-65535) corresponding to (i.e., indicative of or declaring) a request for a 3GPP EAP method Cellular Network ANQP-element. The Length field may be a 2-octet field whose value is set to the length of the EAP method field (1 octet). The EAP method field may be a 1-octet field corresponding to the EAP method values shown in Table 1.

The 3GPP EAP method Cellular Network ANQP response returned by the WLAN may be as shown in Table 5:

TABLE 5

| 3GPP EAP method Cellular Network ANQP-Element Response | | | |
|---|---|---|---|
| | Info ID | Length | Payload (Optional) |
| Octets: | 2 | 2 | variable |

The Info ID field, when included in a 3GPP EAP method Cellular Network ANQP-element response, may be a value (e.g., the number from 273-65535) corresponding to (i.e., indicative of or declaring) a response that includes the 3GPP EAP Method Cellular Network ANQP-element requested via the request above. The Length field may be a 2-octet field whose value is set to the length of the Payload field. The Payload field may be a variable-length field and may be a generic container. The PLMN identifiers returned in the 3GPP EAP method Cellular Network ANQP-element response may indicate the PLMN(s) that support the specific EAP method queried for in the 3GPP EAP method Cellular Network ANQP-element request above. In particular, the responses may be: 1) a list of PLMN(s) identifiers which support the specified EAP method; 2) an empty list (assuming that no PLMNs support the specified EAP method); or 3) no response (if no information is available).

A mobile device may determine if a given PLMN (e.g., a Home PLMN ("HPLMN"), an Equivalent Home PLMN ("EHPLMN"), or a visited PLMN ("VPLMN")) that is identified by the mobile device's credentials is accessible by a particular WLAN. The determination during discovery communications may include a request from a mobile device about the accessibility of the particular PLMN via the WLAN, and the WLAN may respond with an indication of accessibility or no accessibility to the particular PLMN. In other embodiments, the mobile device may determine if any PLMN identified by the mobile device's credentials are accessible by a particular WLAN. In this case, the determination during discovery communications may include a request from a mobile device about the accessibility of the PLMNs via the WLAN, and the WLAN may respond with an indication of accessibility or no accessibility to the PLMNs. A new ANQP-element may be used as a solution. The solution may be a variant of the 3GPP Cellular Network ANQP-element, entitled a "3GPP PLMN Cellular Network ANQP-element", which enables a specific PLMN(s) query to be transmitted to a WLAN to determine accessibility to the identified PLMN(s) via the WLAN. In other embodiments, the new ANQP-element can also refer specifically to the type of desired PLMN, for example, "3GPP HPLMN Cellular Network ANQP-element" refers specifically to a desired HPLMN. In other embodiments, the existing "3GPP Cellular Network ANQP-element" can be modified to only return HPLMNs or eHPLMNs accessible by a particular WLAN.

The requesting mobile device may utilize a 3GPP PLMN Cellular Network ANQP-element request for a specific PLMN as shown in Table 6:

TABLE 6

| 3GPP PLMN Cellular Network ANQP-element Request | | | |
|---|---|---|---|
| | Info ID | Length | PLMN |
| Octets: | 2 | 2 | 3 |

The Info ID field, when included in a 3GPP PLMN Cellular Network ANQP—element request, may be a value (e.g., a number from 273-65535) corresponding to (i.e., indicative of or declaring) a request for a 3GPP PLMN Cellular Network ANQP-element. The Length field may be a 2-octet field whose value is set to the length of the PLMN field. The PLMN field may be a 3-octet field in accordance with the PLMN format.

The 3GPP PLMN Cellular Network ANQP response returned by the WLAN may be shown in Table 7:

TABLE 7

| 3GPP PLMN Cellular Network ANQP-element Response | | | |
|---|---|---|---|
| | Info ID | Length | Payload (Optional) |
| Octets: | 2 | 2 | variable |

The Info ID field, when included in a 3GPP PLMN Cellular Network ANQP—element response, may be a value (e.g., the number from 273-65535) corresponding to (i.e., indicative of or declaring) a response that includes a 3GPP PLMN Cellular Network ANQP-element requested via the request above. The Length field may be a 2-octet field whose value is set to the length of the Payload field. The Payload field may be a variable-length field and is a generic container. The PLMN identifiers returned may indicate those PLMN(s) identified in the request which are found to be accessible via the WLAN. Exemplary responses may include: 1) an identifier of the requested PLMN(s); 2) an identifier of the requested PLMN(s) along with EAP method(s) that the PLMN(s) support; 3) an empty PLMN list; or 4) no response (if no information is available).

Referring back to FIG. 3, there may be a realm 310 accessible via the WLAN 302. The realm 310 may be defined in 3GPP as a home network realm that uses the MCC and MNC from PLMNs as follows: "mnc<MNC>.mcc<MCC>0.3gppnetwork.org." This may be a format for an internet realm name providing authentication and accounting to a core network associated with that home network realm. This format is also referred to as a PLMN Realm. A Network Access Identifier ("NAI") may be used during external network access authentication for identifying users who request access to an external network. The NAI may be used to assist in the routing of the authentication request to the user's authentication server. In one embodiment, a realm may be a domain name on a network, such as the Internet. The WLAN 302 may be connected with one or more realms, such as the realm 310, and information about the realms may be requested during discovery communications by a mobile device.

A mobile device may determine if a given PLMN that is identified by the mobile device's credentials is accessible via a realm. Currently, the existing "Network Access Identifier ("NAI") Home Realm Query ANQP-element" may accept only a realm identifier as the query parameter and not a PLMN identifier. In the present disclosure, a variant of the NAI Home Realm Query ANQP-element is created to allow a specific PLMN query to be made to the WLAN to determine whether that PLMN is accessible.

An info ID indicative of the PLMN Realm ANQP-element may be used by a requesting mobile device to determine whether a WLAN provides accessibility to a specific PLMN. The requesting mobile device includes an identifier of the specific PLMN in a PLMN Realm ANQP-element request, the identifier being encoded as a Home Network Realm as shown in Table 8:

TABLE 8

PLMN Realm ANQP-element request

| | Info ID | Length | PLMN Realm |
|---|---|---|---|
| Octets: | 2 | 2 | variable |

The Info ID field, when included in a PLMN Realm ANQP-element request, may be value (e.g., a number from 273-65535) corresponding to (i.e., indicative of or declaring) a request for a PLMN Realm ANQP-element. The Length field may be a 2-octet field whose value is set to the length of the PLMN Realm field. The PLMN Realm field may be a variable length of the Home Network Realm encoded PLMN identifier. In alternative embodiments, a 3-octet PLMN field may be provided, that is converted to a Home Network Realm format in the ANQP Server.

Another alternative embodiment may utilize an existing implementation of the NAI Home Realm Query ANQP-element using an encoded PLMN identifier for the realm since the messaging parameters of the PLMN Realm field allows for string of alphanumeric characters. In this embodiment, the ANQP Server (connected to the AP) may need to know that the "realm" parameter string is actually an encoded PLMN identifier. In other words the ANQP server should know whether the PLMN identifier within the NAI Home Realm Query ANQP-element is formatted as a realm identifier, or passed as a conventional native PLMN identifier.

In various other embodiments, one or more bit flags may be added to the NAI Home Realm Query ANQP-element to create a New PLMN Realm ANQP-element request. The one or more bit flags signal (i.e., provide an indication) to the ANQP Server that the new PLMN Realm ANQP-element request includes one or more alternative encoding option(s), as shown in Table 9:

TABLE 9

New PLMN Realm ANQP-element request

| | Info ID | Length | Encoding | PLMN Realm |
|---|---|---|---|---|
| Octets: | 2 | 2 | 1 | variable |

The value within the 1-octet "Encoding" field indicates the format of the identifier within the PLMN Realm field.

TABLE 10

PLMN Realm parameter encodings

| Encoding Value | PLMN Realm Description |
|---|---|
| 0 | Realm identifier |
| 1 | PLMN identifier encoded as a Realm identifier |
| 2 | PLMN identifier (to be converted to a Realm identifier in the ANQP Server) |

The New PLMN Realm ANQP response returned by the network in response to the New PLMN Realm ANQP-element request is shown in Table 11:

TABLE 11

New PLMN Realm ANQP-element response

| | Info ID | Length | Realm Data (optional) |
|---|---|---|---|
| Octets: | 2 | 2 | variable |

The Info ID field may be a value corresponding to the New PLMN Realm ANQP-element. The Length field may be a 2-octet field whose value is set to the length of the Realm Data field. The content of the Realm Data field may contain information (e.g., an identifier) having the format (i.e., the encoding format) requested by the New PLMN Realm ANQP-element request.

FIG. 5 illustrates a mobile device 114 as shown in FIGS. 1, 3, and 4. The mobile device 114 includes a processor 502 that may be used to control the overall operation of the mobile device 114. The processor 502 may be implemented using a controller, a general purpose processor, a digital signal processor, dedicated hardware, or any combination thereof. The processor 502 may include a central processing unit, a graphics processing unit, a digital signal processor or other type of processing device. The processor 502 may be a component in any one of a variety of systems. For example, the processor 502 may be part of a standard personal computer or a workstation. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may operate in conjunction with a software program, such as code generated manually (i.e., programmed).

The mobile device 114 also includes a terminal message generator 504 and a terminal data parser 506. The terminal message generator 504 may generate service discovery messages such as the discovery request 116 and discover response 118 for communicating the service information from FIG. 1. The terminal data parser 506 may be used to retrieve network information from memory (e.g., random access memory 510, etc.). For example, the terminal data parser 506 may request PLMN information from a WLAN (e.g., the access networks 106*a-c* of FIG. 1) to identify connected PLMNs.

In the illustrated embodiment, the terminal message generator 504 and the terminal data parser 506 are shown as separate from and connected to the processor 502. In alternative embodiments, the terminal message generator 504 and the terminal data parser 506 may be implemented in the processor 502 and/or in a wireless communication subsystem (e.g., a wireless communication subsystem 518). The terminal message generator 504 and the terminal data parser 506 may be implemented using any combination of hardware, firmware, and/or software. For example, one or more integrated circuits, discrete semiconductor components, and/or passive electronic components may be used. For example, the terminal message generator 504 and the terminal data parser 506, or parts thereof, may be implemented using one or more circuits, programmable processors, application specific integrated circuits, programmable logic devices, field programmable logic devices, etc.

The terminal message generator 504 and the terminal data parser 506, or parts thereof, may be implemented using instructions, code, and/or other software and/or firmware, etc. stored on a machine accessible medium and executable by, for example, a processor (e.g., the processor 502). The terminal message generator 504 or the terminal data parser 506 may be stored on or include a tangible storage medium or memory. For example, the terminal message generator 504 or the terminal data parser 506 may be implemented in software stored on a memory that is executable by the processor 502. Alternatively, the terminal message generator 504 and/or the terminal data parser 506 may be implemented in hardware with software functions. The memory for storing software associated with the terminal message generator 504 and/or the terminal data parser 506 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. In one embodiment, the memory may include the random access memory 510 for the processor 502, or may be an external storage device or database for storing recorded ad or user data. Examples include a hard drive, compact disc ("CD"), digital video disc ("DVD"), memory card, memory stick, floppy disc, universal serial bus ("USB") memory device, or any other device operative to store user data. The memory is operable to store instructions executable by the processor 502.

The mobile device 114 may include a FLASH memory 508, a random access memory 510, and/or an expandable memory interface 512 coupled with the processor 502. The FLASH memory 508 may store computer readable instructions and/or data. In some embodiments, the FLASH memory 508 and/or the RAM 510 may store the discovery communications 120 (service information) from FIG. 1 and instructions for communicating that information. The processor 502 may be coupled with the memory (e.g. the FLASH memory 508, or the RAM 510) for storing software instructions executable by the processor 502. The memory may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The functions, acts or tasks illustrated in the figures or described herein may be performed by the programmed processor 502 executing the instructions stored in the memory. The functions, acts or tasks are independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The mobile device 114 may include a security hardware interface 514 to receive a SIM card from a wireless service provider. A SIM card may be used for service discovery communications including authentication of the mobile device 114 for establishing a connection with a WLAN-supported network. The mobile device 114 may be provided with an external data I/O interface 516. The external data I/O interface 516 may be used by a user to transfer information to the mobile device 114 through a wired medium.

The mobile device 114 may include wireless communication subsystem 518 to enable wireless communications with access points (e.g., the APs 104*a-c* of FIG. 1). Although not shown, the mobile device 114 may also have a long-range communication subsystem to receive messages from, and send messages to, a cellular wireless network. In the illustrated examples described herein, the wireless communication subsystem 518 can be configured in accordance with the IEEE® 802.11 standard. In other example implementations, the wireless communication subsystem 518 may be implemented using a BLUETOOTH® radio, a ZIGBEE® device, a wireless USB device, an ultra-wideband radio, a Near Field Communications ("NEC") device, or a Radio Frequency Identifier ("RFID") device.

The mobile device 114 may include a user interface for communicating with the mobile device. The user interface may be separate component or it may include a speaker 520, a microphone 522, a display 524, and a user input interface 526. The display 524 may be a liquid crystal display, an organic light emitting diode, a flat panel display, a solid state display, a cathode ray tube, a projector, a printer or other now known or later developed display device for outputting determined information. The user input interface 526 may include alphanumeric keyboard and/or telephone-type keypad, a multi-direction actuator or roller wheel with dynamic button pressing capability, a touch panel, etc. The PLMN discovery information that is communicated with a network prior to connection may be communicated with or without each of the user interfaces described herein. The speaker, 520, the microphone 522, the display 524, the user input interface 526, and/or any combination thereof may be omitted in alternative embodiments. In one embodiment, the mobile device 114 is a battery-powered device and includes a battery 528 and a battery interface 530.

Figure 6:
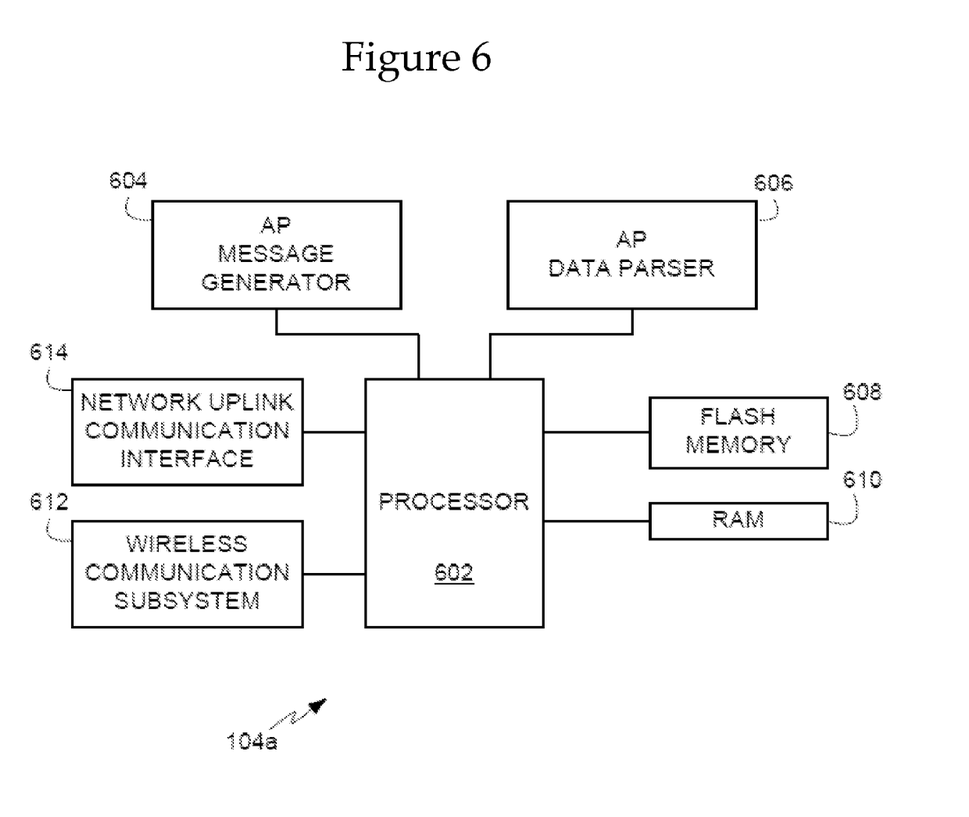
FIG. 6 illustrates an access point ("AP")

FIG. 6 illustrates an access point ("AP") 104*a*. The access point shown in FIG. 6 is AP 104*a*, but may also be illustrative of other access points (e.g. APs 104*b*, 104*c*). AP 104*a* includes a processor 602 to perform operations of the AP 104*a*. The processor 602 may be similar to the processor 502 described above.

The AP 104*a* includes an access point message generator 604 to generate service information communications and an access point data parser 606 for retrieving service information communications from the mobile device 114 and/or the external network A 108*a* as illustrated in FIG. 1. The access point message generator 604 may be similar to the terminal message generator 504 of FIG. 5, and the access point data parser 606 may be similar to the terminal data parser 506 of FIG. 5. As with the terminal message generator 504 and the terminal data parser 506 of FIG. 5, the access point message generator 604 and the access point data parser 606 may be implemented in software stored on a memory that is executable by the processor 602 or may be implemented in hardware with software functions executed by the processor 602. Alternatively, the access point message generator 604 and the access point data parser 606 may be implemented in a wireless communication subsystem (e.g., a wireless communication subsystem 612) using any combination of hardware, firmware, and/or software including instructions stored on a tangible computer readable medium and/or a non-transitory computer readable medium.

The AP 104*a* may also include a FLASH memory 608 and a RAM 610, both of which are coupled to the processor 602. The FLASH memory 608 and/or the random access memory ("RAM") 610 may be configured to store network information (e.g., discovery communications 120, including service information from FIG. 1). The RAM 610 may also be used to generate messages for communication with the mobile device 114 and/or to the external network A 108*a*. The RAM 610 may also store received messages communicated by the mobile device 114 and/or the external network A 108*a*.

To communicate with mobile devices such as the mobile device 114, the AP 104*a* may include a wireless communication subsystem 612, which may be similar to the wireless communication subsystem 518 of the mobile device 114 illustrated in FIG. 5. To communicate with a WLAN-supported network or external network (e.g., the networks 106*a-c*, 108*a*, and 108*b* of FIG. 1), the AP 104*a* may include a network uplink communication interface 614.

When a mobile device receives a list of PLMN identifiers (or indicators) that does not identify the requested PLMN that the mobile device is requesting, the mobile device may be able to search for a realm(s) that is associated with the desired PLMN. For example, a mobile device may be looking for a preferred PLMN and although the PLMN identifiers may not be returned, there may be an Internet realm that has a relationship (or is associated) with the cellular operator controlling the desired PLMN. Accordingly, the discovery communications requesting a particular PLMN identifier (i.e., a desired PLMN) may then utilize a search for a particular realm that is associated with the desired PLMN.

A search for the realm that is associated with the desired PLMN may be generated using a PLMN-to-text string relationship table internal (i.e., stored at) to the mobile device. The relationship table may provide a correlation between the desired PLMN and the associated realm. Specifically, the identifier of the desired PLMN is "looked-up" (i.e., searched for) in the relationship table to determine if a wireless broadband access provider's realm is associated with the desired PLMN identifier. If the desired PLMN identifier is found within the relationship table, the mobile device may use the associated realm to connect to the wireless broadband access provider.

For example, a realm (e.g., "Telesys-free-internet") may be associated with a 3-octet PLMN identifier (e.g., "062 112") of the desired PLMN (e.g., Telesys Mobile).

Figure 7:
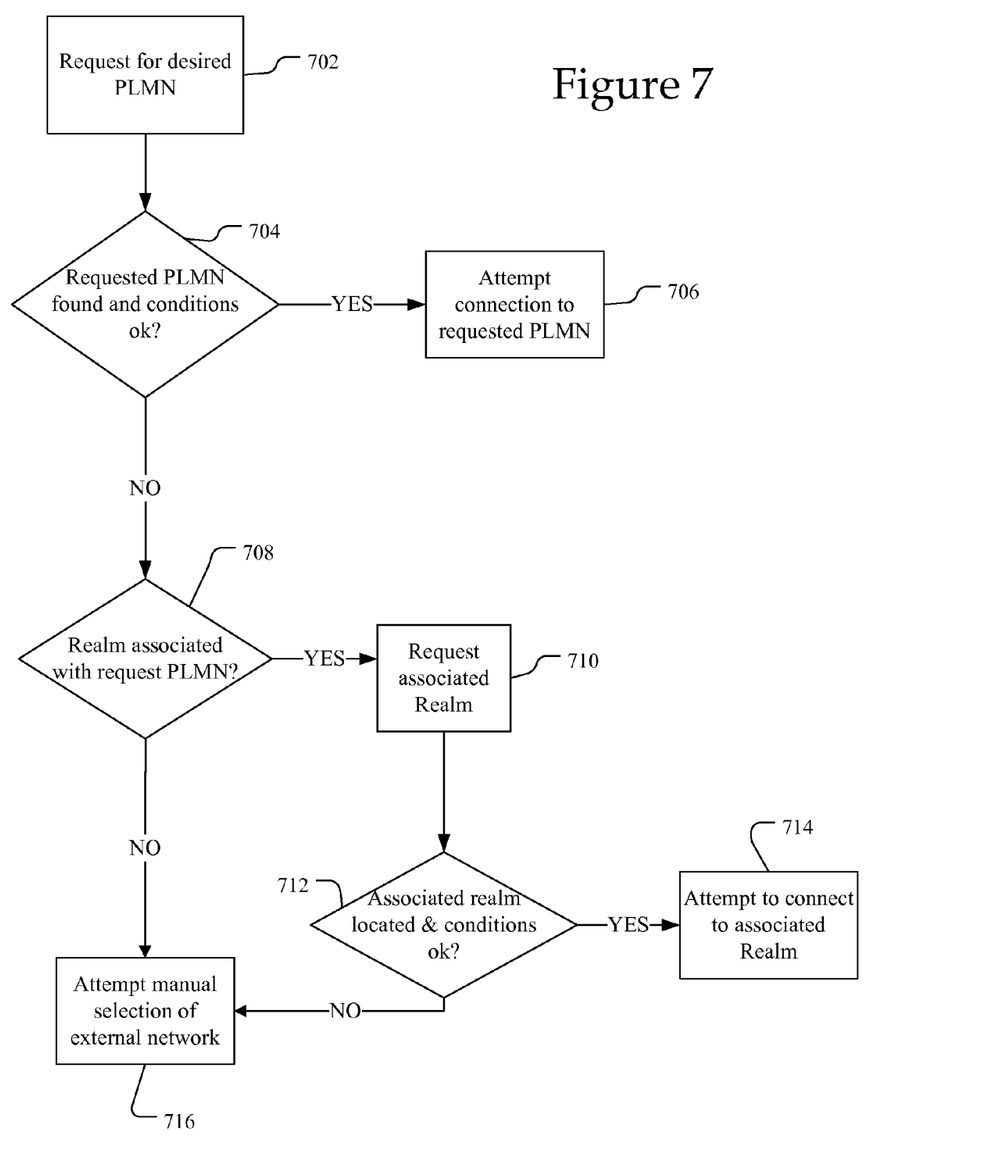
FIG. 7 illustrates an embodiment of the realm selection process.

FIG. 7 illustrates an embodiment of a PLMN selection process where a requested PLMN is not found. In block 702, a request for a desired PLMN is made by a mobile device. In block 704, the mobile device determines whether the requested PLMN is located and whether certain network conditions (e.g., credentials, available bandwidth, and/or cost of use) of the requested PLMN meet the mobile device's criteria or requirements. If the requested PLMN is located and the network conditions meet the mobile device's criteria, then the mobile device attempts to connect to the requested PLMN in block 706. If mobile device does not locate the requested PLMN or the network conditions of the requested PLMN do not meet the mobile device's criteria, then the mobile device searches the relationship table to determine whether a realm associated with the requested PLMN exists in block 708.

If a realm associated with the requested PLMN is present in the relationship table, the mobile device transmits a request (e.g., an ANQP request as described above) for the associated realm at block 710. In block 712, the mobile device determines whether the requested realm (i.e., the associated realm) is located and whether certain network conditions (e.g., credentials, available bandwidth, and/or cost of use) of the requested realm meet the mobile device's criteria or requirements. If the requested realm is located and the network conditions meet the mobile device's criteria, then the mobile device attempts to connect to the requested realm in block 714. If mobile device does not locate the requested realm or the network conditions of the requested realm do not meet the mobile device's criteria, the mobile device performs a manual selection of an external network in block 716. Returning to block 708, if a realm associated with the requested PLMN is not present in the relationship table, the mobile device attempts manual selection of an external network as in block 716.

Figure 8:
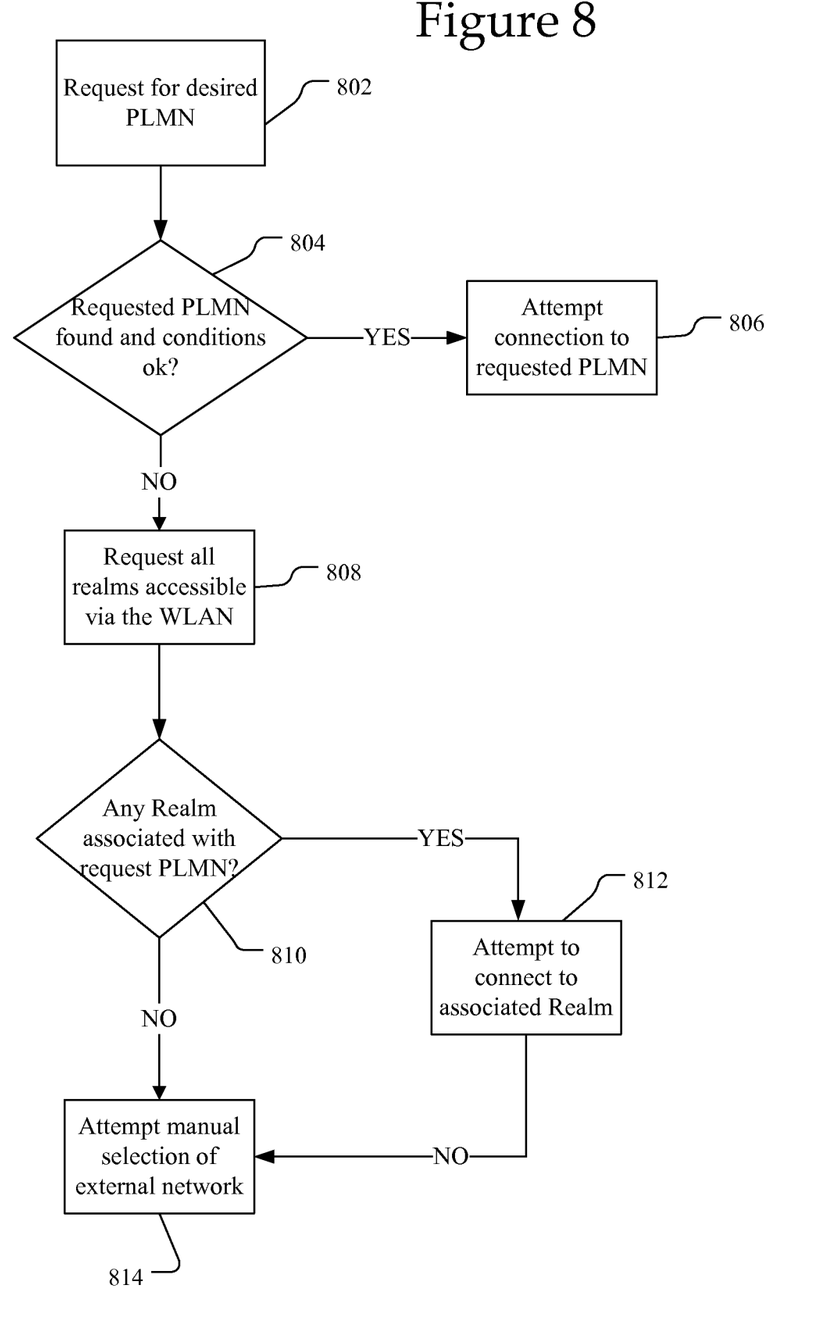
FIG. 8 illustrates another embodiment of the realm selection process.

FIG. 8 illustrates another embodiment of a PLMN selection process. In block 802, a request for a desired PLMN is made by a mobile device. In block 804, the mobile device determines whether the requested PLMN is located and whether certain network conditions (e.g., credentials, available bandwidth, and/or cost of use) of the requested PLMN meet the mobile device's criteria or requirements. If the requested PLMN is located and the network conditions meet the mobile device's criteria, then the mobile device attempts to connect to the requested PLMN in block 806. If mobile device does not locate the requested PLMN or the network conditions of the requested PLMN do not meet the mobile device's criteria, then, in block 808, the mobile device requests (e.g., a ANQP request as described above) any realms associated with the WLAN with which the mobile device is accessing.

In block 810, the mobile device determines whether any realm identified in response to the request above is present in the relationship table (i.e., the mobile device determines whether any realm is associated with the requested PLMN) and determines whether the realm associated with the requested PLMN meets certain network conditions (e.g., credentials, available bandwidth, and/or cost of use) required by the mobile device. If an associated realm is present in the relationship table and that associated realm meets the network conditions required by the mobile device, the mobile device attempts to connect to the requested realm in block 812. If an associated realm is not present in the relationship table or the associated realm does not meet the network conditions required by the mobile device, the mobile device attempts manual selection of an external network in block 814.

The embodiments described herein may be an optimization for mobile devices regarding the discovery of PLMNs at a WLAN hotspot. It may result in a more reliable and faster determination of a WLAN connection to a home service provider which improves the mobile device user experience. Wireless broadband providers may wish to create their own SIMs for internet only traffic using their own PLMNs.

The system and process described may be encoded in a signal bearing medium, a computer readable medium such as a memory, programmed within a device such as one or more integrated circuits, and one or more processors or processed by a controller or a computer. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The invention claimed is:

1. A method in a wireless device, the method comprising:
transmitting, prior to association of the wireless device with a wireless local area network (WLAN), a request from the wireless device, the request requesting any Extensible Authentication Protocol (EAP) methods supported by a public land mobile network (PLMN) accessible via the WLAN;
receiving, prior to association of the wireless device with the WLAN, a first identifier indicative of a first EAP method supported by the PLMN; and
receiving, prior to association of the wireless device with the WLAN, a second identifier indicative of a second EAP method supported by the PLMN.

2. The method of claim 1 wherein the first identifier and the second identifier are received in response to the request.

3. A wireless device, the device comprising:
a processor configured to:
transmit, prior to association of the wireless device with a wireless local area network (WLAN), a request from the wireless device, the request requesting any Extensible Authentication Protocol (EAP) methods supported by a public land mobile network (PLMN) accessible via the WLAN;
receive, prior to association of the wireless device with the WLAN, a first identifier indicative of a first EAP method supported by the PLMN; and
receive, prior to association of the wireless device with the WLAN, a second identifier indicative of a second EAP method supported by the PLMN.

4. The wireless device of claim 3 wherein the first identifier and the second identifier are received in response to the request.

5. The method of claim 1 further comprising determining, prior to association of the wireless device with the WLAN, whether the wireless device uses the first EAP method or the second EAP method in response to receiving the first identifier and the second identifier.

6. The wireless device of claim 3 wherein the first identifier and the second identifier are received prior to authentication of the wireless device with the WLAN.

\* \* \* \* \*